(12) United States Patent
Kulkarni et al.

(10) Patent No.: US 8,015,386 B1
(45) Date of Patent: Sep. 6, 2011

(54) CONFIGURABLE MEMORY MANAGER

(75) Inventors: Chidamber R. Kulkarni, Hyderabad (IN); Gordon J. Brebner, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 798 days.

(21) Appl. No.: 12/059,161

(22) Filed: Mar. 31, 2008

(51) Int. Cl.
*G06F 12/00* (2006.01)
(52) U.S. Cl. .................... 711/202; 710/22; 711/E12.002
(58) Field of Classification Search .................. 711/202, 711/203, 170, E12.002; 710/22, 26
See application file for complete search history.

(56) References Cited

U.S. PATENT DOCUMENTS

| | | | |
|---|---|---|---|
| 6,874,077 B2 * | 3/2005 | Lyon | 711/207 |
| 7,877,524 B1 * | 1/2011 | Annem et al. | 710/22 |
| 2003/0056061 A1 * | 3/2003 | Sherman | 711/131 |
| 2004/0039893 A1 * | 2/2004 | Lyon | 711/207 |
| 2007/0067505 A1 * | 3/2007 | Kaniyur et al. | 710/22 |
| 2009/0216994 A1 * | 8/2009 | Hsieh et al. | 711/207 |

\* cited by examiner

*Primary Examiner* — Pierre-Michel Bataille
(74) *Attorney, Agent, or Firm* — LeRoy D. Maunu

(57) ABSTRACT

A configurable memory manager is configurable with various configuration parameters. The configurable memory manager has client ports for receiving requests for accessing memories and memory ports for accessing respective memories. The client and memory ports are each independently configurable to specify the parameter of a data width of the port. The configurable memory manager includes a switch and a translator. The translator translates a virtual address in each of the requests into an identifier of one of the memories and a physical address in the memory. The switch transfers each request from the client port receiving the request to the memory port for accessing the memory identified by the identifier for the virtual address in the request.

19 Claims, 3 Drawing Sheets

CONFIGURABLE MEMORY MANAGER

FIELD OF THE INVENTION

The present invention generally relates to memory controllers, and more particularly to a configurable manager of a virtual memory system.

BACKGROUND OF THE INVENTION

Programmable logic devices (PLDs) are a well-known type of integrated circuit that can be programmed to perform specified logic functions. One type of PLD, the field programmable gate array (FPGA), typically includes an array of programmable tiles. These programmable tiles can include, for example, input/output blocks (IOBs), configurable logic blocks (CLBs), dedicated random access memory blocks including block RAM (BRAM), multipliers, digital signal processing blocks (DSPs), processors, clock managers, delay lock loops (DLLs), and so forth.

Each programmable tile typically includes both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

A user design may implement a multiprocessing system in a PLD that includes multiple dedicated processors. A user design may also implement a multiprocessing system by implementing soft processors in the programmable logic and interconnect resources of the PLD. An example user design may implement a multiprocessing system in a PLD using a dedicated processor and a soft processor that is a state machine specifically designed to implement a particular function of the user design.

To perform the function of the user design, the processors may need to exchange data. It may be time consuming and expensive to design the protocols for exchanging data between the processors of a multiprocessing system. If not suitably addressed, however, the exchange of data between the processors may limit the performance of the multiprocessing system.

SUMMARY OF THE INVENTION

Various embodiments of the invention provide a configurable memory manager. The configurable memory manager has client ports for receiving requests for accessing memories and memory ports for accessing respective memories. The client and memory ports are each independently configurable to specify a data width of the port. The configurable memory manager includes a switch and a translator. The translator translates a virtual address in each of the requests into an identifier of one of the memories and a physical address in the memory. The switch transfers each request from the client port receiving the request to the memory port for accessing the memory identified by the identifier for the virtual address in the request.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

Figure 1:
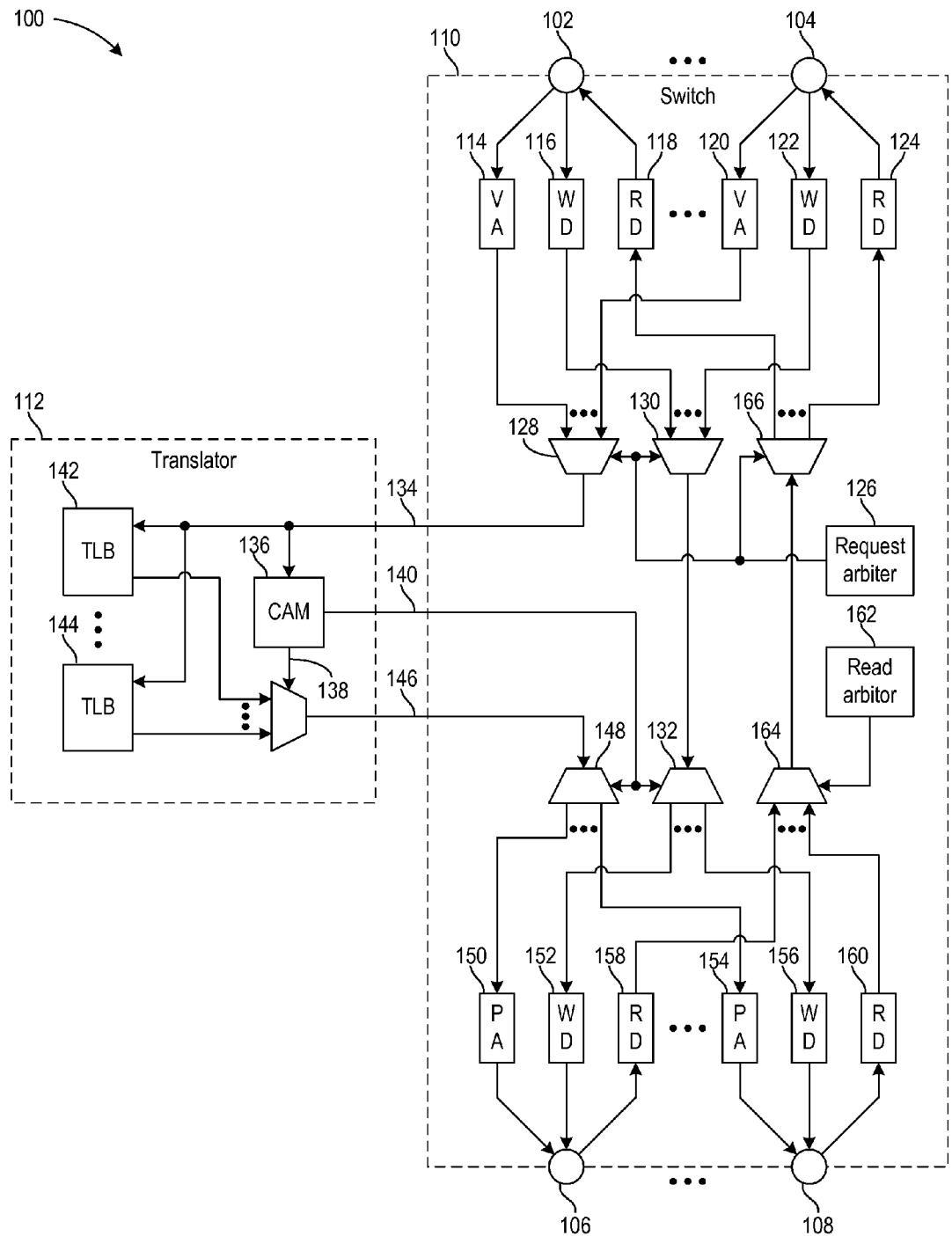
FIG. 1 is a block diagram of a configurable memory manager in accordance with various embodiments of the invention.

FIG. 1 is a block diagram of a configurable memory manager 100 in accordance with various embodiments of the invention. The example configurable memory manager 100 permits processing elements connected to client ports 102 through 104 to access storage in memories connected to memory ports 106 through 108. A switch 110 transfers memory access requests between the client ports 102 through 104 and the memory ports 106 through 108. Translator 112 determines the appropriate one of memory ports 106 through 108 for each memory access request received from the client ports 102 and 104. Various parameters, such as the data widths of ports 102 through 104 and 106 through 108, are configurable in the configurable memory manager 100.

The configurable memory manager 100 receives memory access requests at client ports 102 through 104. Each access request received at a client port, e.g., 102, includes a virtual address 114 and an indicator (not shown) of whether the access request is a read or a write request. If the access request is a write request, port 102 receives write data 116 along with the virtual address 114. If the access request is a read request, port 102 later returns the read data 118 from a memory location corresponding to virtual address 114. Similarly, requests received at port 104 include virtual address 120 and either write data 122 or returned read data 124 as appropriate. It will be appreciated that virtual addresses 114 and 120, write data 116 and 122, and returned read data 118 and 124 may be stored in registers or in FIFO queues for storing multiple requests.

Request arbiter 126 determines which of ports 102 through 104 provides the next request. For example, request arbiter 126 is configured to implement round robin arbitration that accepts available requests from the ports 102 through 104 in a circular ordering of the ports 102 through 104.

The request arbiter 126 controls multiplexer 128 to select the virtual address of the next request from the virtual address, for example, 114 or 120. The request arbiter 126 correspondingly controls multiplexer 130 to select any write data of the next request from the write data, for example, 116 or 122. Multiplexer 128 supplies the virtual address of the next request to translator 112 and multiplexer 130 supplies any write data to demultiplexer 132.

Translator 112 translates the selected virtual address on line 134 into a physical address. In one embodiment, translator 112 includes a content addressable memory 136 that translates the virtual address on line 134 into a translation lookaside buffer (TLB) selector on line 138 and an identifier on line 140 of one of the memory ports 106 through 108. The content addressable memory 136 could include various ranges for the virtual address on line 134 and content addressable memory 136 could associate a TLB selector and a memory identifier with each range. Thus, a virtual address on line 134 is mapped to the TLB selector on line 138 and the memory identifier on line 140 of the range that includes the virtual address on line 134.

In one embodiment, the TLB selector on line 138 and the memory identifier on line 140 are identical. In another embodiment, each range is configurable to specify the TLB selector 138 and the memory identifier 140 independently. In yet another embodiment, each range is configurable to specify the TLB selector 138 and a configurable table lookup provides the memory identifier 140 from the TLB selector 138, or vice versa.

The TLBs 142 through 144 translate a virtual page within the virtual address on line 134 into a physical page. For example, the virtual page is the more significant bits of the virtual address on line 134 and an offset within the virtual page is the less significant bits of the virtual address on line 134. Similarly, the physical page is the more significant bits of the physical address and an offset within the physical page is the less significant bits of the physical address. The offset within the physical page is identical to the offset within the virtual page, so the less significant bits of the physical address are identical to the less significant bits of the virtual address on line 134. Thus, by translating the virtual page into the physical page, the TLBs 142 through 144 translate the virtual address on line 134 into the physical address.

In certain embodiments, the TLBs 142 through 144 perform additional operations, such as checking protection to prohibit read access and/or write access to a virtual page.

The TLB selector on line 138 from content addressable memory 136 determines which TLB 142 or 144 provides the physical address on line 146. The memory identifier on line 140 directs the demultiplexer 148 to send the physical address on line 146 to the appropriate one of memory ports 106 through 108 for the virtual address on line 134 of the memory access request. If the memory access request is a write request, the memory identifier on line 140 also directs demultiplexer 132 to send the write data for the write request from the multiplexer 130 to the appropriate one of memory ports 106 through 108 for the virtual address on line 134 of the write request. For an example write request, the memory identifier on line 140 sends the physical address on line 146 to the physical address queue 150 and sends the write data to the write data queue 152. For another example write request, the memory identifier on line 140 sends the physical address on line 146 to the physical address register 154 and sends the write data to the write data register 156.

For a read request directed to memory port 106, for example, the memory connected to memory port 106 returns the read data at the physical address in the memory to the read data register/queue 158. Similarly, for a read request directed to memory port 108, the memory connected to memory port 108 returns the read data at the physical address in the memory to the read data register/queue 160. The read arbiter 162 controls multiplexer 164 to select the next read data to return from read data register/queue 158 or read data register/queue 160. If multiple memory ports 106 through 108 have available read data to return, the read arbiter 162 select the read data to return according to a round robin arbitration protocol, for example. Demultiplexer 166 sends the selected read data to the appropriate client port 102 or 104 that initiated the read request.

Figure 2:
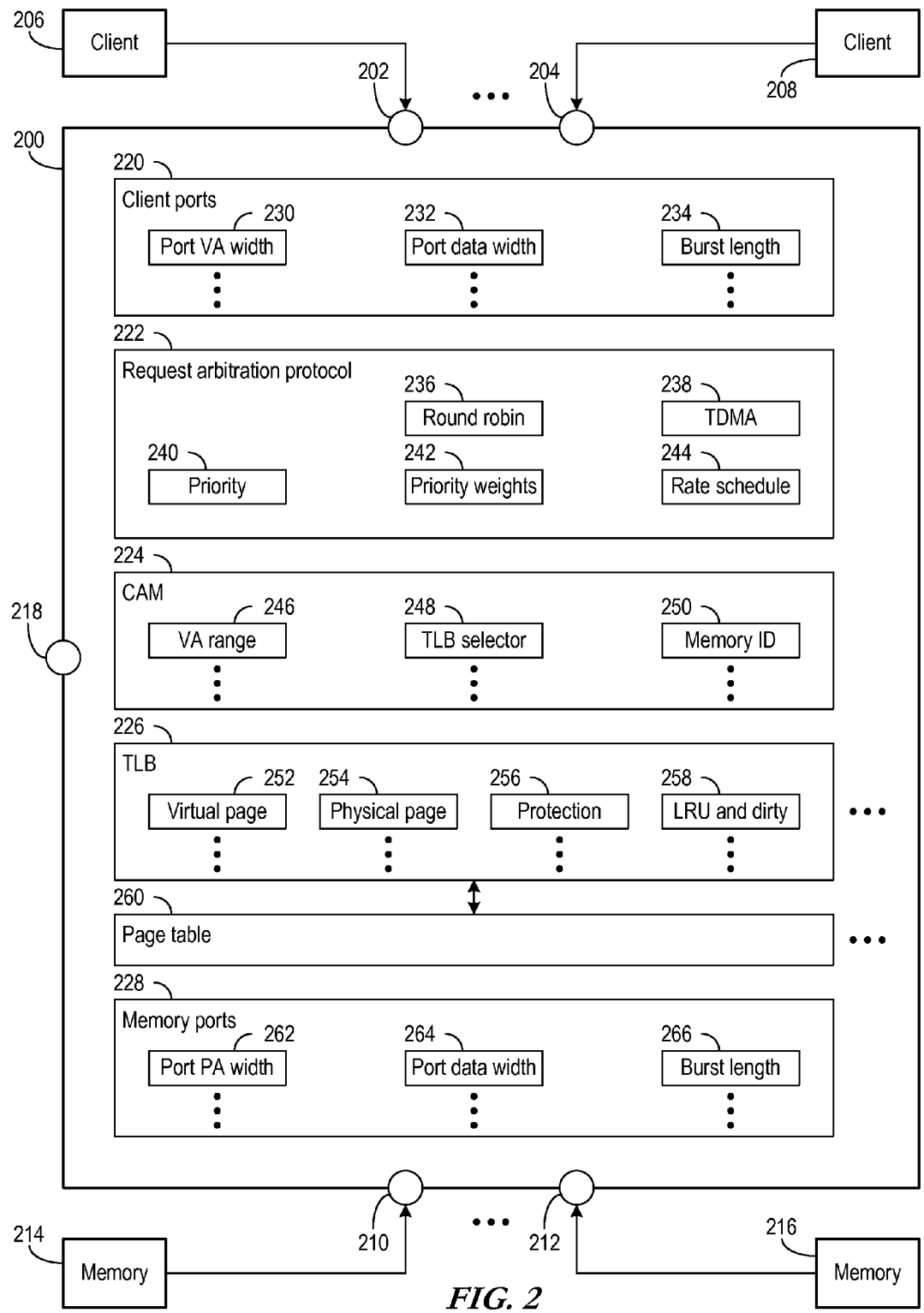
FIG. 2 is a block diagram that illustrates configuration of a configurable memory manager in accordance with various embodiments of the present invention.

FIG. 2 is a block diagram that illustrates configuration of a configurable memory manager 200 in accordance with various embodiments of the invention. The configurable memory manager 200 has client ports 202 through 204 for receiving memory access requests from the clients 206 through 208. The configurable memory manager 200 has memory ports 210 through 212 for accessing memories 214 through 216. Various parameters of the configurable memory manager 200 are configurable by way of register values input via the configuration port 218. It will be appreciated that the parameters are configurable via the client ports 202 through 204 in one embodiment. For example, the configurable memory manager 200 could make the parameters accessible for reading and writing within a range of the virtual address space of one or more of the clients 206 through 208.

In one embodiment, the configurable memory manager includes parameters 220 for configuring the client ports 202 through 204, parameters 222 for configuring the request arbitration protocol and the arbitration protocol for returning read data, parameters 224 for configuring a content addressable memory, parameters 226 for configuring TLBs, and parameters 228 for configuring the memory ports 210 through 212.

Parameters 220 configure the client ports 202 through 204. Parameter 230 configures the width of the virtual address received in memory access requests at client port 202. Parameter 232 configures the width of read data and write data transferred via client port 202. Parameter 234 configures the burst length of read data and write data transferred via client port 202. For example, parameter 234 sets the number of consecutive data cycles needed to transfer read and write data and parameter 232 sets the number of data bits transferred in each data cycle. It will be appreciated that a data bus could have a fixed width for transferring read and write data at client port 202, but that memory manager 200 is configurable to utilize a fraction of the data bus for transferring read and write data. Client port 204 is similarly configurable by additional parameters 220, including configuring client port 204 to have different widths than client port 202.

Parameters 222 configure the request arbitration protocol for accepting memory access requests from the client ports 202 through 204. It will be appreciated that the arbitration protocol for returning read data is similarly configured in one embodiment. Parameter 236 selects a round robin for the arbitration protocol and parameter 238 selects a time division multiple access. Time division multiple access is a generalization of round robin. Round robin selects the next available request within a fixed circular ordering of the client ports 202 through 204. Time division multiple access selects the next available request within a dynamic circular ordering of the client ports 202 through 204. For example, the client ports 202 through 204 are dynamically ordered according to how recently a request has been accepted, such that if configurable memory manager 200 has accepted a request from client port 202 more recently than from client port 204, then client port 204 has a dynamically higher priority than client port 202.

Parameter 240 selects a fixed priority for the arbitration protocol for client ports 202 through 204. For example, parameter 240 configures client port 204 always to have a higher priority than client port 202. However, fixed priority arbitration has disadvantages, such as the starvation of requests from the lower priority ports. Parameter 242 selects a weighted fixed priority for the arbitration protocol. For example, parameter 242 sets a limit on the number of requests accepted from the highest priority port before accepting one request reserved for one of the lower priority ports. The second highest priority port gets all of the reserved requests until the number of these reserved requests reaches another limit, and so on. Thus, the weight limit for each client port 202 through 204 reserves a fraction of the request bandwidth for all of the lower priority ports.

Parameter 244 selects a rate schedule for the arbitration protocol for accepting memory access request from client ports 202 through 204. For example, each client port 202 through 204 has a queue of available memory access requests and the bandwidth for accepting requests from each queue is the number of requests in the queue relative to the total number of queued requests.

Parameters 224 configure a content addressable memory of the configurable memory manager 200. The content addressable memory is configurable with ranges of virtual addresses. In one embodiment, each range 246 includes an upper limit and a lower limit by specifying a match value for the more significant bits of the virtual address. The range 246 may include a match field for the match value and an enable field identifying the more significant bits of the virtual address to compare with the match value. A virtual address is within the range when the virtual address matches the match value in the bits not masked by the enable field. Because the width of the virtual address of a port is configurable with parameter 230, the enable value could also mask any bits of the match field exceeding the selected width of the virtual address.

Associated with each range 246 is a TLB selector 248 and a memory identifier 250. The TLB selector 248 is configurable to use any one of a number of TLBs to translate the virtual address that matches the range. The memory identifier 250 is configurable to direct the memory access request to any one of the memory ports 210 through 212.

In one embodiment, the parameters 224 for the content addressable memory are configurable while the configurable memory manager 200 is actively processing requests. For example, the TLB selector 248 is reconfigured to redirect virtual addresses within the range 246 to a different TLB that has already been initialized to map the virtual addresses to different physical addresses. This reconfiguration permits the virtual addresses to map dynamically to different physical addresses in the same memory, or in a different memory by also reconfiguring memory identifier 250. An extra TLB can be provided for such dynamic reconfiguration, or a spare TLB can be available in a particular application because either not all memory ports 210 through 212 are utilized in the application or one TLB is used for multiple memory ports 210 through 212.

It will be appreciated that the content addressable memory may include a set of range comparers each configurable with an upper and lower limit in each range 246 of the virtual addresses.

Parameters 226 configure a TLB of the configurable memory manager 200. Similar parameters configure the additional TLBs of the configurable memory manager 200. Parameter 252 configures one of multiple virtual pages in the virtual address space of the virtual addresses. Associated with the virtual page specified by parameter 252 is a parameter 254 for configuring the physical page associated with the virtual page, parameter 256 for configuring the protection of the virtual page, and parameter 258 for specifying flags of the virtual page.

In one embodiment, the protection specified by parameter 256 can abort or ignore prohibited memory access requests.

For example, a virtual page can be designated as read-only, such that memory write requests to the virtual page are aborted or ignored.

The flags specified by parameter 258 can indicate whether any memory write requests have successfully accessed the virtual page, and whether the virtual page is less recently used than other virtual pages in the TLB. The "dirty" flag helps determine whether a client, for example client 206, can destroy the virtual page without destroying any data written to the virtual page.

In one embodiment, each TLB has an associated page table configured by parameters 260. The page table contains all the virtual pages in the virtual address space managed by the TLB and the TLB is a cache containing the recently used virtual pages. If the TLB does not currently contain the translation information for a received memory access request, the configurable memory manager 200 copies the translation information from the page table to the TLB. The less-recently-used flag helps determine whether parameters 252, 254, 256, and 258 or other parameters are overwritten upon copying the translation information into the TLB.

Parameters 228 configure the memory ports 210 through 212. Parameter 262 configures the width of the physical address for memory port 210, parameter 264 configures the data width for memory port 210, and parameter 266 configures the data burst length for memory port 210. Memory port 212 is similarly configurable by parameters 228.

Figure 3:
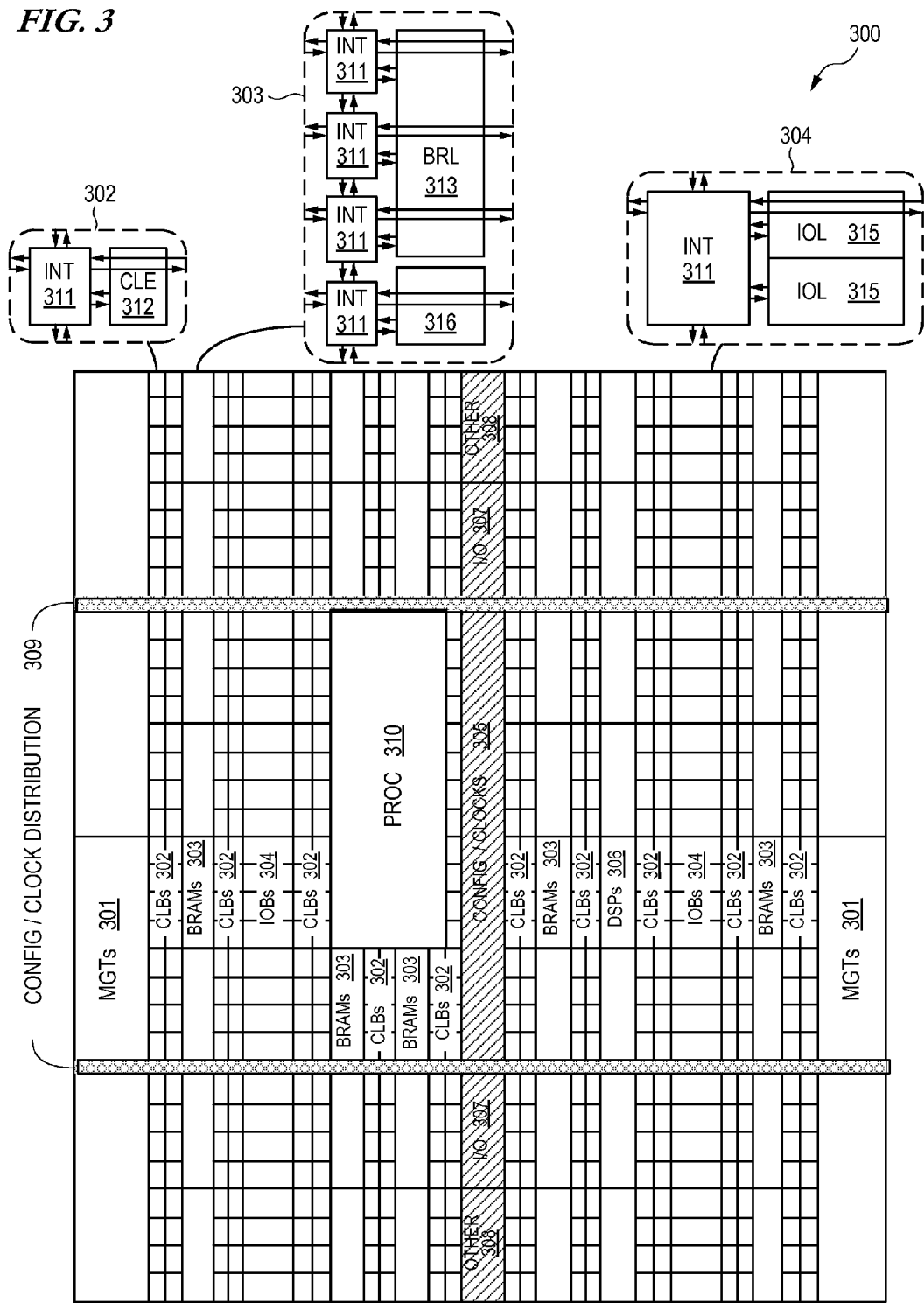
FIG. 3 is a block diagram of a programmable logic device that may include a configurable memory manager in accordance with one or more embodiments of the present invention.

FIG. 3 is a block diagram of a programmable logic device that may include a configurable memory manager 316 in accordance with one or more embodiments of the invention.

As noted above, advanced PLDs can include several different types of programmable logic blocks in the array. For example, FIG. 3 illustrates an FPGA architecture 300 that includes a large number of different programmable tiles including multi-gigabit transceivers (MGTs 301), configurable logic blocks (CLBs 302), random access memory blocks (BRAMs 303), input/output blocks (IOBs 304), configuration and clocking logic (CONFIG/CLOCKS 305), digital signal processing blocks (DSPs 306), specialized input/output blocks (I/O 307) (e.g., configuration ports and clock ports), and other programmable logic 308 such as digital clock managers, analog-to-digital converters, system monitoring logic, and so forth. Some FPGAs also include dedicated processor blocks (PROC 310).

In some FPGAs, each programmable tile includes a programmable interconnect element (INT 311) having standardized connections to and from a corresponding interconnect element in each adjacent tile. Therefore, the programmable interconnect elements taken together implement the programmable interconnect resources for the illustrated FPGA. The programmable interconnect element (INT 311) also includes the connections to and from the programmable logic element within the same tile, as shown by the examples included at the top of FIG. 3.

For example, a CLB 302 can include a configurable logic element (CLE 312) that can be programmed to implement user logic plus a single programmable interconnect element (INT 311). A BRAM 303 can include a BRAM logic element (BRL 313) and a configurable memory manager 316 in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. Similarly, a DSP tile 306 can include a DSP logic element in addition to an appropriate number of programmable interconnect elements. An IOB 304 can include, for example, two instances of an input/output logic element (IOL 315) in addition to one instance of the programmable interconnect element (INT 311). As will be clear to those of skill in the art, the actual I/O pads connected, for example, to the I/O logic element 315 are manufactured using metal layered above the various illustrated logic blocks, and typically are not confined to the area of the input/output logic element 315.

The BRAM logic element 313 may be used as a block memory by a user design that disables the configurable memory manager 316. Together, one or more of the BRAM logic elements 313 and a configurable memory manager 316 may implement a virtual memory system. For example, the configurable memory manager 316 may store each page table in one BRAM logic element 313 and use multiple BRAM logic elements 313 for the one memory of the virtual memory system and also use memory external to the FPGA architecture 300 for another memory of the virtual memory system. It will be appreciated that certain BRAM 303 of architecture 300 may omit the configurable memory manager 316.

In the pictured embodiment, a columnar area near the center of the die (shown shaded in FIG. 3) is used for configuration, clock, and other control logic. Horizontal areas 309 extending from this column are used to distribute the clocks and configuration signals across the breadth of the FPGA.

Some FPGAs utilizing the architecture illustrated in FIG. 3 include additional logic blocks that disrupt the regular columnar structure making up a large part of the FPGA. The additional logic blocks can be programmable blocks and/or dedicated logic. For example, the processor block PROC 310 shown in FIG. 3 spans several columns of CLBs and BRAMs.

Note that FIG. 3 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 3 are purely exemplary. For example, in an actual FPGA more than one adjacent column of CLBs is typically included wherever the CLBs appear, to facilitate the efficient implementation of user logic.

The present invention is thought to be applicable to a variety of configurable memory managers. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A configurable memory manager, comprising:
   a first plurality of ports, each port of the first plurality arranged to receive requests for accessing a plurality of memories, and each port of the first plurality being independently configurable to specify one of a first plurality of data widths of the port;
   a second plurality of ports, each port of the second plurality arranged to access a respective one of the memories, each port of the second plurality being independently configurable to specify one of a second plurality of data widths of the port;
   a translator configured to translate a virtual address of each of the requests into an identifier of one of the memories and a physical address in the memory;
   wherein the translator is configurable to associate each port of the second plurality with any one of a plurality of translation look-aside buffers, each translation look-aside buffer configured to translate the virtual address of each request into the physical address for the associated port; and
   a switch coupled to the translator and to the first and second pluralities of ports, the switch, responsive to the identifier translated from a request received at a port of the first plurality, arranged to transfer the physical address translated from the request to a port of the second plurality for accessing the memory identified by the identifier.

2. The configurable memory manager of claim 1, wherein two ports of the first plurality are configurable to specify respective data widths for the two ports that are a same one or different ones of the first plurality of data widths.

3. The configurable memory manager of claim 1, wherein two ports of the second plurality are configurable to specify respective data widths for the two ports that are a same one or different ones of the second plurality of data widths.

4. The configurable memory manager of claim 1, wherein each port of the first and second pluralities is independently configurable to specify the data width of the port and a number of successive data transfers of the requests for the port.

5. The configurable memory manager of claim 1, wherein the translator includes a content addressable memory that is configurable to associate the identifier with a plurality of ranges of the virtual address of the requests.

6. The configurable memory manager of claim 1, wherein the translator includes a content addressable memory that is configurable to associate each of the plurality of translation look-aside buffers with a respective plurality of ranges of the virtual address of the requests.

7. The configurable memory manager of claim 1, wherein the translator is dynamically configurable, while the configurable memory manager is processing at least one of the requests, to change an association of the identifier of one of the memories from one to another of the plurality of translation look-aside buffers for translating the virtual address of the requests into the physical address.

8. The configurable memory manager of claim 1, wherein the switch is configurable to select an arbitration protocol for ordering acceptance of the requests among the first plurality of ports.

9. The configurable memory manager of claim 8, wherein the switch includes a request arbiter that implements at least two arbitration protocols from round robin, time domain multiple access, priority for the first plurality of ports, weighted priority for the first plurality of ports, and rate based scheduling, and the request arbiter is configurable to select the arbitration protocol from the at least two arbitration protocols.

10. The configurable memory manager of claim 1, wherein the switch is configurable to select an arbitration protocol for ordering acceptance among the second plurality of ports of a plurality of responses from the memories to the requests.

11. The configurable memory manager of claim 1, further comprising a configuration port arranged for configuration of the first and second pluralities of ports, the translator, and the switch.

12. The configurable memory manager of claim 1, further comprising a configuration port arranged for configuration of a page table for translating the virtual address of each of the requests into the physical address in the memory identified by the identifier.

13. The configurable memory manager of claim 1, further comprising a configuration port arranged for configuration of one of the translation look-aside buffers of the translator with a width of the virtual addresses of the requests received at a port of the first plurality.

14. The configurable memory manager of claim 1, wherein the translator includes a block memory for storing each translation look-aside buffer, and the translation look-aside buffer having a respective entry for each of a plurality of virtual pages included in the virtual address of recently received ones of the requests, the respective entry including a physical page of the physical address, the physical page associated with the virtual page in a table of the virtual pages.

15. The configurable memory manager of claim 1, wherein the translator includes a block memory for storing each translation look-aside buffer, and the translation look-aside buffer having a respective entry for each of a plurality of virtual pages included in the virtual address of recently received ones of the requests, the respective entry including a protection specifying permitted access by the requests having the virtual address that includes the virtual page, the protection specifying the permitted access that is at least one of read access and write access.

16. The configurable memory manager of claim 1, wherein the translator includes a block memory for storing each translation look-aside buffer, and the translation look-aside buffer having a respective entry for each of a plurality of virtual pages included in the virtual address of recently received ones of the requests, the respective entry including a least-recently-used flag and a dirty flag, the least-recently used flag indicating the virtual page is not included in the virtual addresses of more recently received ones of the requests, and the dirty flag indicating the requests include a write request that has the virtual page included in the virtual address of the write request.

17. The configurable memory manager of claim 1, wherein the switch transfers the request that is a read request from the port of the first plurality receiving the read request to the port of the second plurality for the memory of the identifier for the virtual address of the read request and transfers read data for the read request at the physical address in the memory from the port of the second plurality to the port of the first plurality, and the switch transfers the request that is a write request and includes write data from the port of the first plurality receiving the write request to the port of the second plurality for the memory of the identifier for the virtual address of the write request.

18. The configurable memory manager of claim 1, wherein the configurable memory manager is included within a programmable logic device that also includes configurable logic and interconnect resources, and the first and second pluralities of ports are coupled to the configurable interconnect resources of the programmable logic device.

19. The configurable memory manager of claim 18, wherein the programmable logic device further includes at least one block memory for storing a page table for translating the virtual address of each of the requests into the physical address in the memory identified by the identifier.

* * * * *